July 29, 1930.
R. HOE
1,771,630
POWER UNIT
Filed March 21, 1928    3 Sheets-Sheet 2
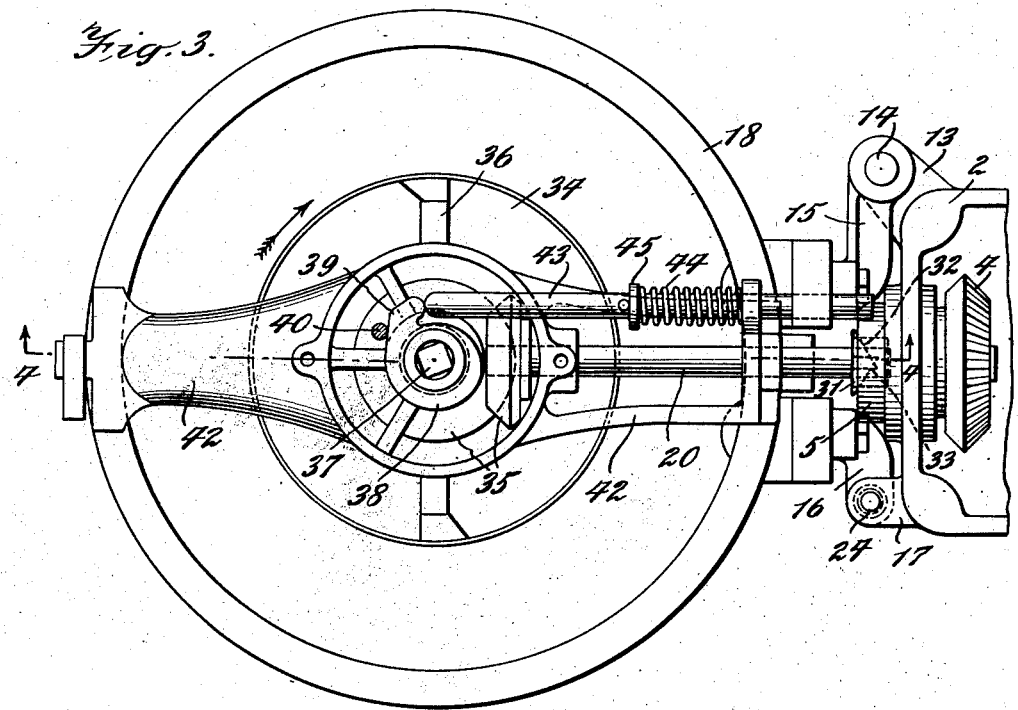
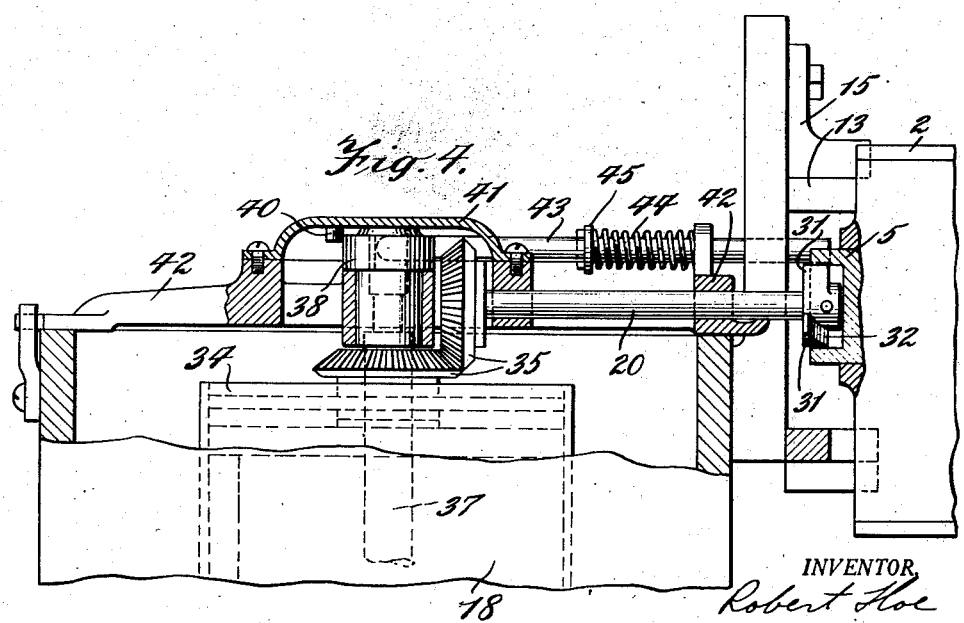
INVENTOR,
Robert Hoe
BY Gifford & Scull
ATTORNEYS.

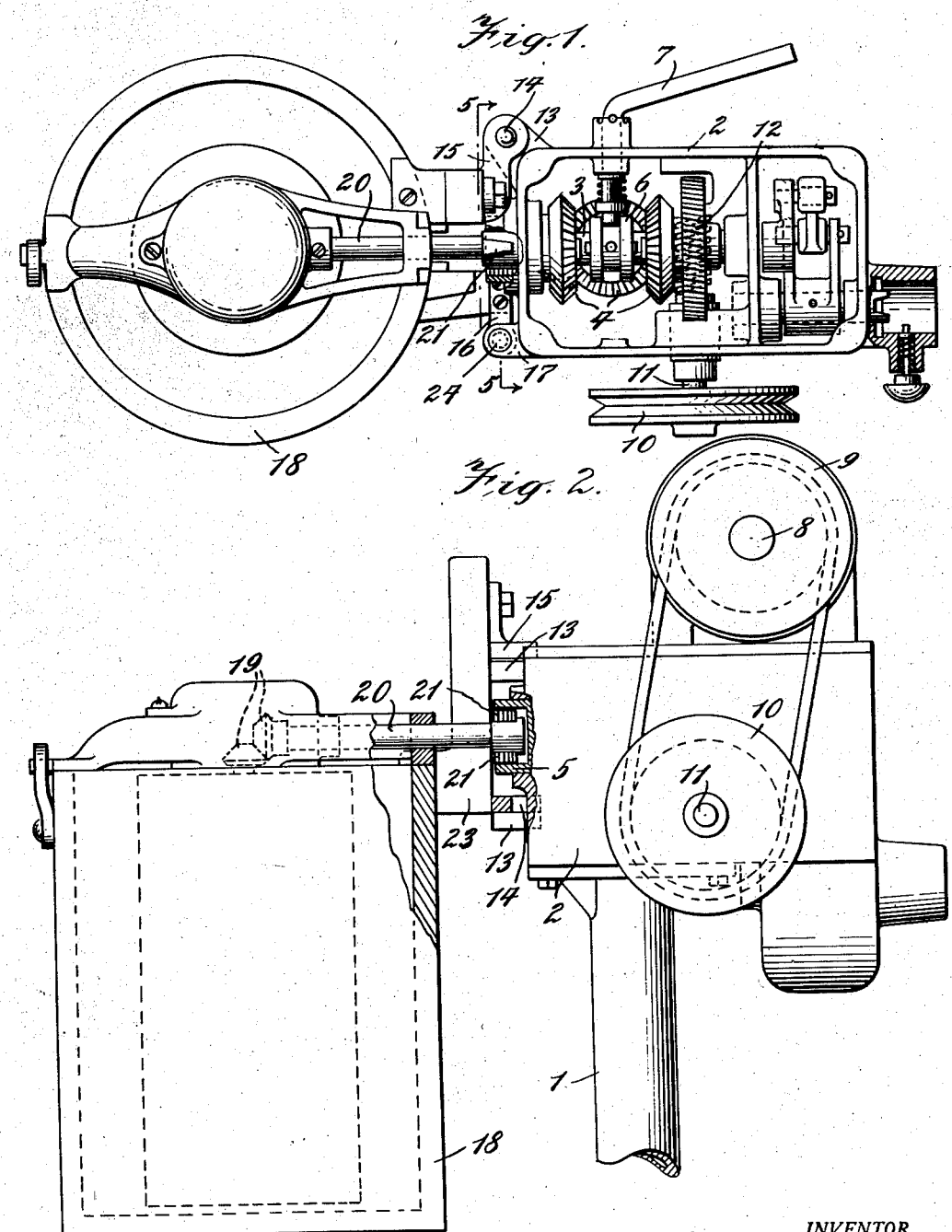

July 29, 1930.     R. HOE     1,771,630
POWER UNIT
Filed March 21, 1928     3 Sheets-Sheet 3
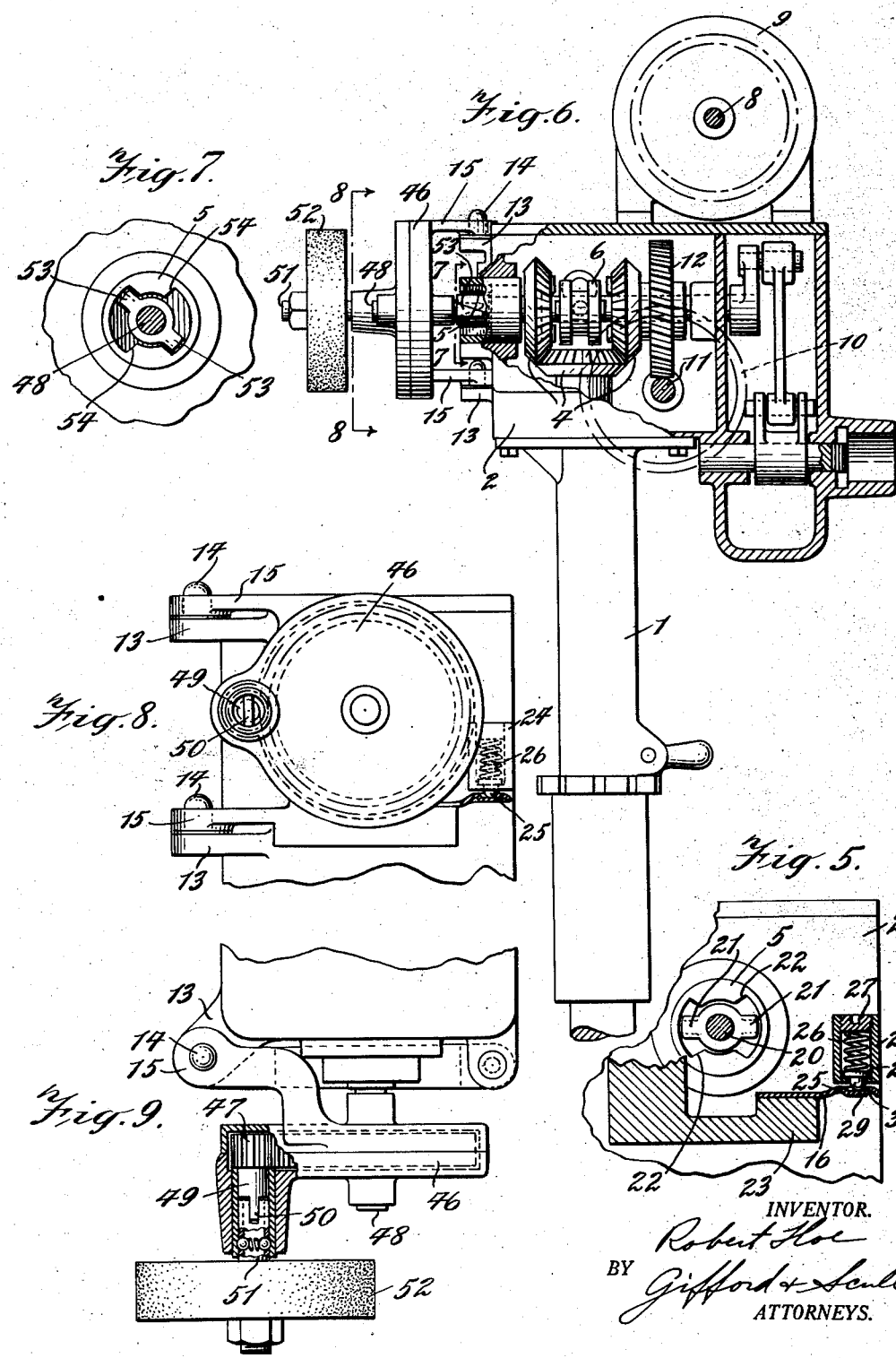

Patented July 29, 1930

1,771,630

UNITED STATES PATENT OFFICE

ROBERT HOE, OF HYDE PARK, NEW YORK

POWER UNIT

Application filed March 21, 1928. Serial No. 263,322.

This invention relates to novel improvements in power units, and has for its principal object to provide a power unit having means for releasably securing thereto a device to be operated in such a manner that the driving connection between the power unit and the device will be automatically broken under certain conditions which might tend to cause damage to the device.

In the accompanying drawings, in which I have shown selected embodiments of the invention:—

Fig. 1 is a plan view through a power unit constructed according to one form which my invention may take, the cover of the unit being removed and parts being shown broken away.

Fig. 2 is a front elevation of the device shown in Fig. 1.

Fig. 3 is a view similar to Fig. 1, but showing another form which my invention may take, the details of the power unit being omitted from this figure.

Fig. 4 is a section on the line 4—4 of Fig. 3.

Fig. 5 is a section on the line 5—5 of Fig. 1.

Fig. 6 is a vertical sectional view through a power unit, showing a different form which the invention may take.

Fig. 7 is a section on the line 7—7 of Fig. 6.

Fig. 8 is a view taken on the line 8—8 of Fig. 6, with the attachment removed.

Fig. 9 is a plan view of the structure shown in Fig. 8, parts being broken away, and parts being shown in section.

Referring first to Figs. 1 and 2, I have shown my power unit as of the general type described and claimed in my copending application, Serial No. 215,329, filed August 25, 1927.

The unit comprises a standard 1 supporting a casing 2, within which is disposed a driving shaft 3 which, through suitable gearing including the bevel gears 4, may cause rotation of the hub 5 in either direction. A suitable clutch mechanism 6 is used to govern rotation of this hub, and may be operated by means of the handle 7, all as more fully described in my aforesaid copending application.

Mounted upon the casing 2 is a motor, the motor proper not being shown in this application, but including a shaft 8 upon which is mounted a pulley 9 which causes rotation of a second pulley 10 on a shaft 11. This shaft 11 is operatively connected by gearing 12 to the shaft 3.

Disposed at the end of the casing through which the hub 5 projects, is a pair of ears 13 having pintles 14 over which may be slipped the ears 15 on any device which it is desired to operate by means of the rotating hub 5. Each such device is preferably provided with a finger 16 forming one member of a latch which is adapted to yieldingly engage with another member of the latch carried by an ear 17 projecting from the casing.

The device shown herein is an ice cream freezer 18 having the usual gearing 19 for operating the same, this gearing being actuated by means of the shaft 20. In this form of the invention, the shaft 20 is provided with oppositely disposed clutch elements 21 which are adapted to cooperate with mating elements on the hub 5. As best shown in Fig. 5, the elements on the hub are formed as shoulders 22 at the ends of arcuate recesses, and the recesses are of substantially greater length or circumferential extent than the width of the elements 21, whereby a certain amount of lost motion is provided, thus making it easier to engage the clutch elements on the shaft and hub.

As best shown in Figs. 1 and 5, the elements 21 are provided with oppositely disposed wedge faces, whereby when the load on the shaft 20 becomes excessive, the elements will tend to wedge themselves out of engagement with the shoulders 22 and thereby disconnect the clutch and the operating connection between the hub 5 and the shaft 20. It will be seen that both faces of the elements 21 are inclined and therefore the above result will follow, no matter in which direction the shaft may be rotated.

The device is preferably held in yielding operative engagement with the power unit, so that the parts will normally be in correct operative relation with respect to each other, but so that they may be disconnected when the load on the device reaches a predetermined amount. The means for holding the parts in this yielding engagement is best shown in Fig. 5, and the illustrative embodiment herein disclosed comprises the finger 16 which is preferably formed of resilient sheet metal, and which is secured to the frame 23 which supports the device 18.

Secured to the casing 2 is a sleeve 24 in which is mounted a detent 25, urged downwardly by a spring 26. The force of this spring may be adjusted by the screw 27 threaded into the sleeve 24. The detent is prevented from falling out of the sleeve by the shoulder 28 which is adapted to engage a flange on the lower end of the sleeve, as plainly shown in Fig. 5. The finger is provided with a recess 29 to receive the detent, this recess being surrounded by a ridge 30 which forms a cam for a purpose which will presently appear.

When a device is mounted upon the power unit casing, it is essential that the clutch elements should be properly alined when they are in cooperative position. Inaccuracies in making and fitting the hinge members or other parts, often cause lack of proper alinement, but with the yielding retaining means described above, when the device is swung toward the casing, the ridge 30 will push up the spring-pressed detent and then this detent will engage the inner surface of the ridge and will cam the finger 16 and consequently the entire device into proper position. Therefore, the retaining means also acts as a centering means to center the shafts with respect to each other.

In addition to the above described function of the retaining means, it also serves the following purpose. It will be noted that the device is hinged to the power unit by means of two elements with a pin on one of said elements received within a hole in an ear on the other element, and that the connecting and disconnecting of the two elements is achieved by a straight vertical movement. There is a tendency on the part of the clutch elements, particularly when they are first swung into engagement, to exert a lifting force upon the device which tends not only to lift the device on the hinge pin, but also tends to cause the clutch element on the driven shaft to hit against the top of the recess in which it is received, thus causing damage to the clutch elements. By disposing the finger 16 beneath the sleeve 24, the lifting action referred to above is prevented, first by the spring-pressed detent, and finally by the positive engagement of the finger with the sleeve. The action of the spring-pressed detent is normally sufficient to prevent the vertical motion of the device. Therefore, it will be seen that the latch described affords a positioning means which will not only center the shafts, but will correctly position them in other respects, and will correctly position the device as a whole.

Referring now to Figs. 3 and 4, I have shown therein a form of my invention which I now consider to be the preferred form. In these two figures, the details of the operating mechanism inside the casing 2 have been omitted.

The hub 5 is rotated through the same or similar mechanism to that shown in Fig. 1, and may be rotated in either direction. The device 18 is secured to the casing in the same manner, and corresponding numerals have been applied to parts in Figs. 3 and 4 which are similar to those in Figs. 1 and 2. It is not believed necessary to redescribe these parts.

In this form, the shaft 20 preferably has oppositely disposed clutch elements 31, each of which has one inclined face 32 and an oppositely disposed face 33, the face 33 being substantially parallel to the axis of the shaft. This arrangement provides a means whereby the elements 31 will be wedged out of engagement with the corresponding elements on the hub 5, when the shaft 20 is revolved in one direction, whereas a positive connection is furnished when the shaft is turned in the opposite direction. It is intended that the shaft 20 shall always operate so as to turn the container 34 in a clockwise direction, as viewed in Fig. 3, as indicated by the arrow in that figure. This container is turned by rotation of the shaft 20 through suitable bevel gears 35. It is customary in an ice cream freezer, for example, to have the container and the blades in the container rotating in opposite directions. In my invention, however, I preferably let the blades 36 remain stationary and rotate the container alone. The relative movement between the container and the blades is thus achieved.

The blades are mounted on the shaft 37 and at its upper end this shaft is provided with a hub 38 having an outwardly extending arm 39. This arm and consequently the shaft and the blades 36 are prevented from rotating in a counterclockwise direction by engagement with a stop 40 secured to the cap 41. This cap is mounted on a frame 42 which is secured to the device 18 in any suitable manner.

Mounted on the frame 42 and slidably supported in bearings thereon, is a plunger 43 which is normally urged into engagement with the arm 39 as by means of a spring 44 disposed between a shoulder 45 on the plunger and a fixed part of the frame. The inner end of the plunger 43 is normally disposed adjacent the casing 2, but spaced therefrom as plainly shown.

In operation, the power unit is set in operation so as to rotate the container 34 in the direction of the arrow, or clockwise in this embodiment. If by accident the unit is so actuated as to tend to cause rotation in the opposite direction, the clutch member automatically is disconnected by the wedge action of the elements 31, it being understood that the finger 16 and ear 17 are yieldingly secured together by a centering device preferably such as that shown in Fig. 5.

As the container rotates, the cream therein will be stirred by the action of the blades 36 in the container. As the cream becomes thicker, it will exert an action on the blades, tending more and more to move them with the cream, this action being resisted by the plunger 43 acting against the arm 39. By proper selection and adjustment of the spring 44, the device may be so arranged that when the cream reaches the proper consistency, the force exerted thereby will overcome the resistance of the spring and force the plunger 43 against the wall of the casing 2. The force exerted by the plunger will cause the device to swing outwardly on its hinge, and the clutch will be disconnected, thereby breaking the connection between the hub 5 and the shaft 20.

For the purposes of this application, the hub 5 will be claimed as the driving shaft for the driven shaft 20.

Referring now to Figs. 6, 7, 8 and 9, I have shown therein a still further embodiment which my invention may take. In Fig. 6, I have shown parts similar to those shown and described in connection with Figs. 1 and 2, and a detailed description of these parts will not be repeated. In this form, the hub 5 is constructed substantially in the same manner as shown in Figs. 1, 2 and 5, and the device which is hinged to the casing is shown as a gear box 46 which may contain a train of gearing, a part of which is shown at 47, in Fig. 9, and this gearing may connect the shaft 48 with a power outlet indicated as a shaft 49. This shaft 49 has suitable clutch elements 50 which are adapted to cooperate with corresponding clutch elements on a shaft 51. In this form, the shaft 51 is shown as supporting a stone 52 for sharpening tools, although it is to be understood that any other mechanism may be mounted on the shaft 51.

As shown in Figs. 6 and 7, the shaft 48 carries on its inner end clutch elements 53 which cooperate with elements on the hub 5 formed by shoulders 54 at the ends of arcuate recesses. These elements 53 are wedge-shaped as plainly shown in Fig. 6, whereby rotation of the shaft 48 in one direction will be prevented by the elements 53 wedging themselves out of engagement with the elements 54. When the shaft is rotated in the opposite direction which is the proper one, the square faces of the elements 53 will positively engage the shoulders 54 and thus be rotated.

It will thus be seen that I have provided a power unit having embodied therein a driving shaft and a driven shaft, the hub 5 being considered as the driving shaft, it being understood that this hub is mounted upon a stub shaft. These shafts are operatively connected by means which will be automatically broken under certain conditions, either when the driven shaft is attempted to be rotated in the wrong direction, or when the load upon the driven shaft becomes excessive. Cooperating with the above means is the centering device which holds the two shafts in proper relative position so that the clutch elements may be properly engaged.

While I have shown certain selected embodiments, it is to be understood that various changes will readily suggest themselves to those skilled in the art, and I do not intend to limit myself except by the appended claims.

In said copending application Serial No. 215,329, I have disclosed and claimed the combination of the power unit and device hinged thereto, together with shafts on the unit and device adapted to be clutched together when the device is properly positioned on the hinge which connects it to the power unit. Therefore, I do not intend to claim herein any of the above subject matter.

I claim:—

1. In combination, a power unit having a driving shaft, a device adapted to be operated by said power unit and comprising a driven shaft to be rotated in one direction, a hinge connecting said device to said unit, a clutch between said shafts and means to disconnect the clutch when the driven shaft is rotated in the other direction.

2. In combination, a power unit having a driving shaft, a device adapted to be operated by said power unit and comprising a driven shaft, a hinge connecting said device to said unit, a clutch to connect said shafts, means yieldingly holding said device in position wherein said clutch will connect said shafts, and means to disconnect said clutch when the load on said driven shaft exceeds a predetermined amount.

3. In combination, a power unit having a driving shaft, a device adapted to be operated by said power unit and comprising a driven shaft to be rotated in one direction, a hinge connecting said device to said unit, a clutch to connect said shafts, means yieldingly holding said device in position wherein said clutch will connect said shafts, and means to disconnect said clutch when the load on said driven shaft exceeds a predetermined amount, and means to disconnect the clutch when said driven shaft is rotated in the other direction.

4. In combination, a power unit having a driving shaft, a device adapted to be operated by said power unit and comprising a driven shaft, a hinge connecting said device to said unit, a clutch to connect said shafts, means to position said shafts with respect to each other, said means comprising two elements, one a finger having a recess therein surrounded by a ridge, and the other a detent adapted to be received in said recess, one of said elements being mounted on said unit and the other on said device, and means yieldingly urging said detent and finger towards each other when in operative position.

5. In combination, a power unit having a driving shaft, a device adapted to be operated by said power unit and comprising a driven shaft, coacting clutch elements on said shafts, a hinge connecting said device to said unit and comprising two members, a hinge pin and a member coacting therewith and brought into engagement with the pin by movement lengthwise thereof, and means preventing movement of said hinge members with respect to each other when said clutch elements are brought into cooperative relationship, said means yieldingly holding said clutch elements in said cooperative relationship.

6. In combination, a power unit having a driving shaft, a device adapted to be operated by said power unit and comprising a driven shaft, a hinge connecting said device to said unit, a clutch to connect said shafts comprising elements on each shaft, and means to so position said device with respect to the unit as to render said clutch operative and to yieldingly hold said elements in engagement.

7. In combination, a power unit having a driving shaft, a device adapted to be operated by said power unit and comprising a driven shaft, a hinge connecting said device to said unit, means operatively connecting said shafts, means to disconnect said shafts when the load on said driven shaft exceeds a predetermined amount, and means holding said shafts in operative relation and yieldingly resisting the operation of said disconnecting means.

8. In combination, a power unit having a driving shaft, a device adapted to be operated by said power unit and comprising a driven shaft, a member rotated thereby, a second member normally stationary with respect to said first member, and means actuated by said normally stationary member to disconnect said shafts when there is a substance between the members of sufficient strength to transmit the required force from one member to the other.

9. In combination, a power unit having a driving shaft, a device adapted to be operated by said power unit and comprising a driven shaft, a container rotated by said driven shaft, a member in said container and normally stationary, and means actuated by said member upon movement thereof to disconnect said shafts.

10. In combination, a power unit having a driving shaft, a device adapted to be operated by said power unit and comprising a driven shaft, a clutch between said shafts, a member rotated by said driven shafts, a second member normally stationary with respect to said first member, means yieldingly resisting motion of said second member, and means operating upon motion of said second member against the action of said yielding means to disconnect said clutch.

11. In combination, a power unit having a driving shaft, a device adapted to be operated by said power unit, said device comprising a driven shaft, means detachably connecting said shafts, a container rotated by said driven shaft, a member in said container and supported upon a shaft independent of said driven shaft, an arm projecting radially from said last-named shaft, a plunger disposed between said arm and a fixed part of said power unit, one end of the plunger being in contact with said arm, and normally out of contact with said fixed part.

12. In combination, a power unit having a driving shaft, a device adapted to be operated by said power unit and hinged thereto, said device comprising a driven shaft, means detachably connecting said shafts, a container rotated by said driven shaft, a member in said container and supported upon a shaft independent of said driven shaft, an arm projecting radially from said last-named shaft, a plunger disposed between said arm and a fixed part of said power unit, one end of the plunger being in contact with said arm, and normally out of contact with said fixed part.

13. In combination, a power unit having a driving shaft, a device adapted to be operated by said power unit, said device comprising a driven shaft, means detachably connecting said shafts, a container rotated by said driven shaft, a member in said container and supported upon a shaft independent of said driven shaft, an arm projecting radially from said last-named shaft, a plunger disposed between said arm and a fixed part of said power unit, one end of the plunger being in contact with said arm and normally out of contact with said fixed part, a spring urging said plunger into contact with said arm and out of contact with said fixed part, and a stop limiting rotation of said arm under the action of said spring-pressed plunger.

14. In combination, a power unit having a driving shaft, a device adapted to be operated by said power unit and comprising a driven shaft, a container rotated by said driven shaft, a member in said container and normally stationary, means actuated by said member upon rotation thereof to disconnect said shafts, and means automatically disconnecting said shafts upon rotation thereof in the wrong direction.

15. In combination, a power unit having a driving shaft, a device adapted to be operated by said power unit, said device comprising a driven shaft, means detachably connecting said shafts, an element rotated by said driven shaft, a member supported upon a shaft independent of said driven shaft, an arm projecting radially from said last-named shaft, a plunger disposed between said arm and a fixed part of said power unit, one end of the plunger being in contact with said arm, and normally out of contact with said fixed part.

16. In combination, a power unit having a driving shaft, a device adapted to be operated by said power unit and hinged thereto, said device comprising a driven shaft, means detachably connecting said shafts, an element rotated by said driven shaft, a member supported upon a shaft independent of said driven shaft, an arm projecting radially from said last-named shaft, a plunger disposed between said arm and a fixed part of said power unit, one end of the plunger being in contact with said arm, and normally out of contact with said fixed part.

17. In combination, a power unit having a driving shaft, a device adapted to be operated by said power unit and comprising a driven shaft, a hinge connecting said device to said unit, a clutch to connect said shafts comprising elements on each shaft, an element on one shaft being received in a space on the other shaft which is of greater circumferential extent than the element received therein, thereby forming a lost motion connection, and means to so position said device with respect to said unit as to render said clutch operative.

ROBERT HOE.